United States Patent
Han

(10) Patent No.: US 10,409,344 B2
(45) Date of Patent: Sep. 10, 2019

(54) ELECTRONIC DEVICE HAVING TEMPERATURE MANAGEMENT FUNCTION

(71) Applicants: INVENTEC (PUDONG) TECHNOLOGY CORPORATION, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 355 days.

(21) Appl. No.: 15/203,777

(22) Filed: Jul. 6, 2016

(65) Prior Publication Data

US 2017/0293331 A1    Oct. 12, 2017

(30) Foreign Application Priority Data

Apr. 12, 2016    (CN) .......................... 2016 1 0224900

(51) Int. Cl.
G05B 15/02    (2006.01)
G06F 1/20    (2006.01)
G05B 19/05    (2006.01)

(52) U.S. Cl.
CPC ........... *G06F 1/206* (2013.01); *G05B 19/058* (2013.01); *G05B 2219/14006* (2013.01); *G05B 2219/14043* (2013.01)

(58) Field of Classification Search
CPC ...... G06F 1/206; G06F 11/3058; G06F 17/10; G06F 1/3206; G05B 23/0235; H05K 7/20836; H05K 7/20209; Y02D 10/16; G01K 15/005; G01K 1/20; G01K 7/425; G01K 7/427; G05D 23/1928; G05D 23/1931; G05D 23/32
See application file for complete search history.

(56) References Cited

U.S. PATENT DOCUMENTS

| | | | | |
|---|---|---|---|---|
| 4,759,498 | A * | 7/1988 | Levine | F23N 5/203 165/269 |
| 6,169,442 | B1 * | 1/2001 | Meehan | G01K 7/01 327/307 |
| 6,658,345 | B2 * | 12/2003 | Miller | F02D 41/2474 123/41.31 |
| 6,728,262 | B1 * | 4/2004 | Woram | G05B 19/05 370/241 |
| 7,139,687 | B2 * | 11/2006 | Eryilmaz | G05B 17/02 703/2 |

(Continued)

*Primary Examiner* — Darrin D Dunn
(74) *Attorney, Agent, or Firm* — Maschoff Brennan

(57) ABSTRACT

An electronic device having a temperature management function includes a platform controller hub (PCH), a complex programmable logic device (CPLD) and a hardware monitor. The PCH includes a first temperature sensor for sensing the first temperature of the PCH. The CPLD includes a memory and is coupled to the PCH. The CPLD reads the first temperature sensed by the first temperature sensor and saves it in the memory. The CPLD searches for an offset value in the memory and generates a device temperature according to the offset value and the first temperature. The hardware monitor is coupled to the CPLD and reads the device temperature.

7 Claims, 2 Drawing Sheets

(56) References Cited

U.S. PATENT DOCUMENTS

| | | | | |
|---|---|---|---|---|
| 7,484,380 B2* | 2/2009 | Flanigan | ............ | G05D 23/1905 236/49.3 |
| 8,197,133 B2* | 6/2012 | Schultz | ................ | G01F 1/6965 374/1 |
| 8,768,530 B2* | 7/2014 | Liang | ................ | G05D 23/1932 318/471 |
| 8,898,358 B2* | 11/2014 | DeCesaris | ............ | G06F 13/385 710/105 |
| 9,055,697 B2* | 6/2015 | Lyon | ................ | H05K 7/20836 |
| 9,326,323 B2* | 4/2016 | Aljabari | .................. | G01K 1/20 |
| 9,500,535 B1* | 11/2016 | Urban | ................... | G01K 7/427 |
| 9,506,815 B2* | 11/2016 | Moore | .................... | G06F 1/206 |
| 9,671,767 B2* | 6/2017 | Naffziger | ............ | G05B 15/02 |
| 9,765,984 B2* | 9/2017 | Smith | ...................... | F24F 11/30 |
| 2004/0262409 A1* | 12/2004 | Crippen | ................ | G06F 1/206 236/49.3 |
| 2005/0004717 A1* | 1/2005 | Fukushima | ........ | G05D 23/1931 700/299 |
| 2005/0075837 A1* | 4/2005 | Espinoza-Ibarra | ... | G06F 13/409 702/182 |
| 2006/0032250 A1* | 2/2006 | Flanigan | ............ | G05D 23/1905 62/157 |
| 2006/0052970 A1* | 3/2006 | Arabi | ...................... | G06F 1/206 702/132 |
| 2008/0024147 A1* | 1/2008 | Tsuchiya | .............. | G01D 3/0365 324/721 |
| 2010/0169585 A1* | 7/2010 | Steinbrecher | ........... | G06F 1/206 711/154 |
| 2012/0136978 A1* | 5/2012 | Lou | ......................... | G06F 1/206 709/223 |
| 2012/0268216 A1* | 10/2012 | Borremans | ........ | G05D 23/1928 331/70 |
| 2013/0131885 A1* | 5/2013 | Huang | ............... | G05D 23/1932 700/300 |
| 2013/0204442 A1* | 8/2013 | Modi | ........................ | F24F 11/30 700/278 |
| 2014/0142764 A1* | 5/2014 | Chen | ................... | H05K 7/20209 700/276 |
| 2015/0003491 A1* | 1/2015 | Matsumoto | .............. | G01K 1/20 374/1 |
| 2015/0019711 A1* | 1/2015 | Zhang | ................. | H04L 43/0817 709/224 |
| 2015/0330841 A1* | 11/2015 | Kern | ........................ | G01K 3/10 700/275 |
| 2016/0109892 A1* | 4/2016 | Johnson | ......... | G05D 23/1902 700/300 |
| 2016/0147270 A1* | 5/2016 | Artman | ..................... | G06F 1/206 361/679.48 |
| 2016/0161960 A1* | 6/2016 | Yamada | .............. | G06F 1/206 700/277 |
| 2016/0231755 A1* | 8/2016 | Ajax | ........................ | G05B 15/02 |
| 2017/0023272 A1* | 1/2017 | Erickson | .............. | F24F 11/0012 |
| 2017/0102750 A1* | 4/2017 | Cox | ........................ | G01K 7/42 |
| 2017/0177044 A1* | 6/2017 | Limaye | .................... | G06F 1/203 |
| 2017/0272033 A1* | 9/2017 | Rivaud | .................... | H03B 5/04 |
| 2017/0343418 A1* | 11/2017 | Hurbi | ...................... | G01N 25/72 |
| 2017/0347420 A1* | 11/2017 | McDonald | ......... | H05B 33/0854 |
| 2017/0354007 A1* | 12/2017 | Samson | ................. | F21S 8/086 |
| 2018/0004262 A1* | 1/2018 | Lovicott | ................ | G06F 1/206 |
| 2018/0052007 A1* | 2/2018 | Teskey | ................. | B81B 7/0087 |
| 2018/0066998 A1* | 3/2018 | Merrikh | ................. | G01K 1/20 |
| 2018/0073933 A1* | 3/2018 | Keskin | .................. | G01K 1/026 |
| 2018/0089048 A1* | 3/2018 | Zou | ...................... | H05K 7/20836 |
| 2018/0120127 A1* | 5/2018 | Kotwal | ............... | G01C 25/005 |

* cited by examiner

ELECTRONIC DEVICE HAVING TEMPERATURE MANAGEMENT FUNCTION

CROSS-REFERENCE TO RELATED APPLICATIONS

This non-provisional application claims priority under 35 U.S.C. § 119(a) on Patent Application No(s). 201610224900.3 filed in China on Apr. 12, 2016, the entire contents of which are hereby incorporated by reference.

BACKGROUND

Technical Field

The disclosure relates to an electronic device having a temperature management function, more particularly to an electronic device capable of performing temperature management according to the temperature of a platform controller hub.

Related Art

Conventional server motherboards usually have a central processing unit (CPU), a memory, a baseboard management controller (BMC) and other components. BMC is a management component of the entire server motherboard and has one or more functions such as the control of the video graphics array (VGA) output, the operation of a temperature sensor and the system signals, debugging, providing the function of dedicated NIC, executing the function of flash memory, and establishing a redundant array of independent disks.

Some existing motherboards do not support a BMC but support a platform controller hub for self-management, and such a motherboard cannot provide some of the functions that a BMC can provide, such as controlling a temperature sensor or a fan. Therefore, a hardware monitor is used to detect the temperature of each component on the motherboard, and the detection result is used as a reference to control a fan or other temperature control components on the motherboard. However, the hardware monitor cannot read the temperature of the platform controller hub.

SUMMARY

According to one or more embodiments, an electronic device, having a temperature management function, includes a platform controller hub, a complex programmable logic device and a hardware monitor. The platform controller hub includes a first temperature sensor used for sensing a first operational temperature of the platform controller hub. The complex programmable logic device includes a built-in memory and is coupled to the platform controller hub. The complex programmable logic device reads the first operational temperature obtained by the first temperature sensor, and stores the first operational temperature in the built-in memory. The complex programmable logic device also searches for at least one offset value in the built-in memory and generates a device temperature according to at least the offset value and the first operational temperature. The hardware monitor is coupled to the complex programmable logic device and reads the device temperature.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
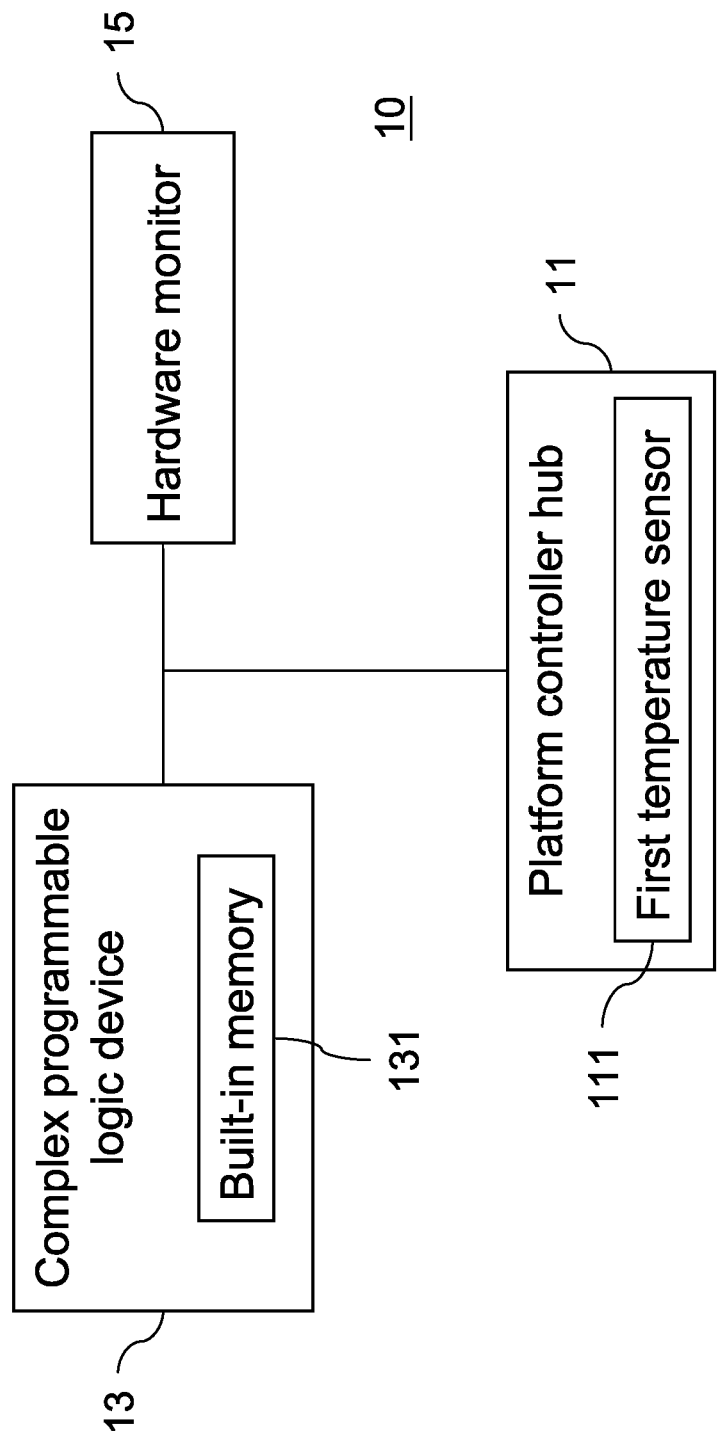
FIG. 1 is a functional block diagram of an electronic device having a temperature management function according to an embodiment of the disclosure.

Please refer to FIG. 1; FIG. 1 is a functional block diagram of an electronic device having a temperature management function according to an embodiment of the disclosure. As shown in FIG. 1, an electronic device 10 includes a platform controller hub (PCH) 11, a complex programmable logic device (CPLD) 13 and a hardware monitor 15. The electronic device 10 is, for example, a motherboard in a server or other suitable devices. The platform controller hub 11 is electrically connected to the complex programmable logic device 13 and the hardware monitor 15.

In an embodiment, the transmission interface used by the platform controller hub 11 is, for example, a system management bus (SMBUS), a general purpose input/output (I/O) bus, an inter-integrated circuit ($I^2C$) bus or another suitable transmission interface. For a concise explanation, the following embodiments are illustrated based on the case of SMBUS.

The platform controller hub 11 includes a first temperature sensor 111. The first temperature sensor 111 senses the first operational temperature of the platform controller hub 11, which is the temperature that the platform controller hub 11 is operating. The complex programmable logic device 13 includes a built-in memory 131. The complex programmable logic device 13 reads the first operational temperature obtained by the first temperature sensor 111, and stores the first operational temperature in the built-in memory 131. The complex programmable logic device 13 searches for an offset value in the built-in memory 131 and generates a device temperature according to the offset value and the first operational temperature.

In an embodiment, after the complex programmable logic device 13 reads the first operational temperature obtained by the first temperature sensor 111, the complex programmable logic device 13 searches for an offset value related to the platform controller hub 11 in a temperature lookup table stored in the built-in memory 131, and corrects the first operational temperature with the found offset value. The corrected first operational temperature is set as the above device temperature and is read by the hardware monitor 15.

In the case of SMBUS as the transmission interface that is used by the platform controller hub 11 to electrically connect to the complex programmable logic device 13 and the hardware monitor 15, when the complex programmable logic device 13 tries to read the first operational temperature of the platform controller hub 11, the complex programmable logic device 13 is the master on the SMBUS, and the platform controller hub 11 and other components on the SMBUS are slaves on the SMBUS. Therefore, the complex programmable logic device 13, through the SMBUS, reads the operational temperature of the platform controller hub 11 or another component. When the hardware monitor 15 makes a request to read the temperature, the hardware monitor 15 and the complex programmable logic device 13 switch to a master and a slave on the SMBUS, respectively, so the complex programmable logic device 13 provides the hardware monitor 15 with the device temperature after reading the device temperature from the built-in memory 131 through the SMBUS.

Figure 2:
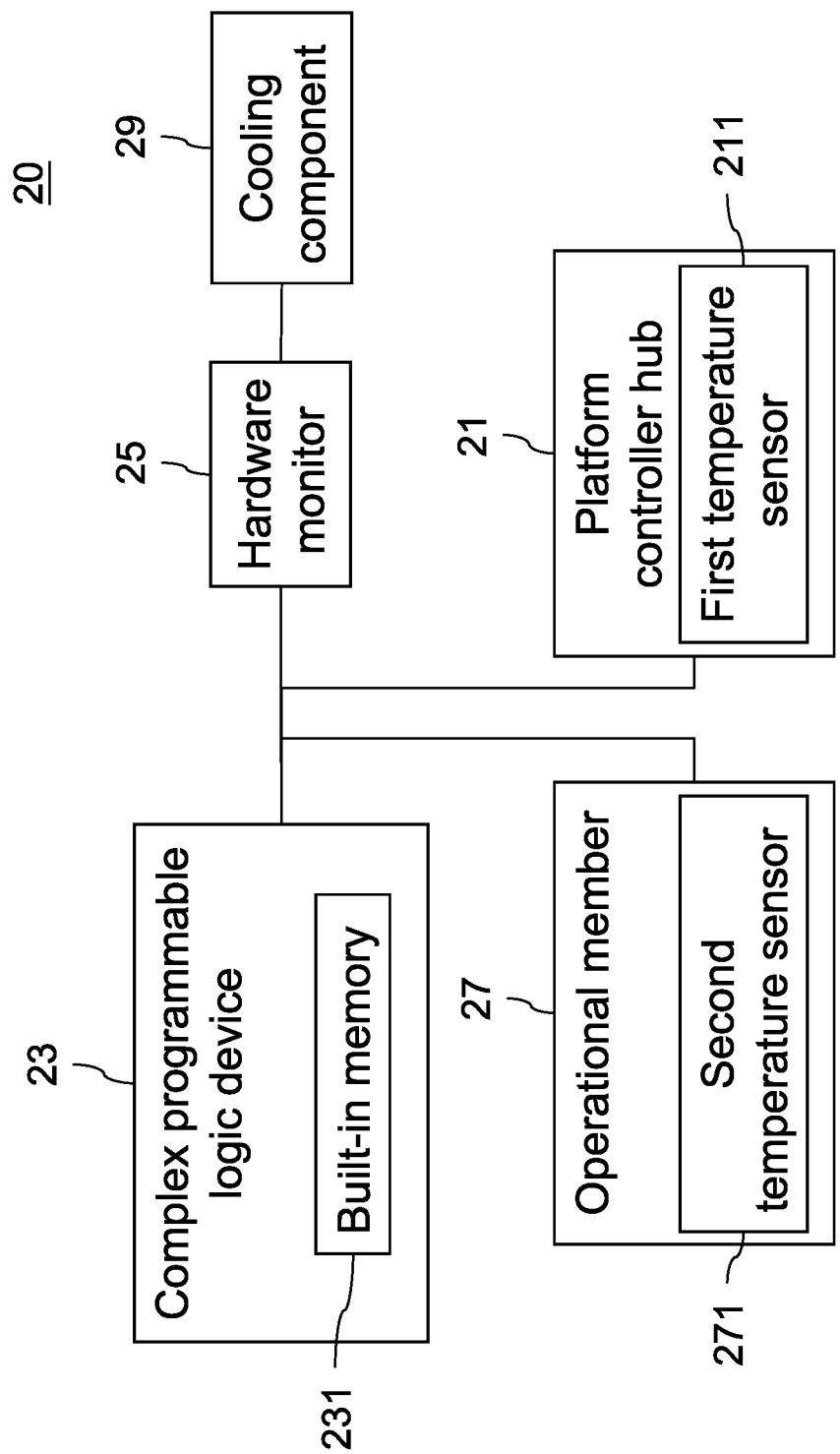
FIG. 2 is a functional block diagram of an electronic device having a temperature management function according to another embodiment of the disclosure.

Please refer to FIG. 2; FIG. 2 is a functional block diagram of an electronic device having a temperature management function according to another embodiment of the disclosure. As shown in FIG. 2, an electronic device 20 includes a platform controller hub 21, a complex programmable logic device 23, a hardware monitor 25, an operational member 27 and a cooling component 29. The electronic device 20 is, for example, a motherboard of a server or another suitable device. The platform controller hub 21 is electrically connected to the complex programmable logic device 23, the hardware monitor 25 and the operational member 27. The hardware monitor 25 is electrically connected to the cooling component 29.

In an embodiment, the transmission interface used by the platform controller hub 21 is, for example, a SMBUS, a general purpose I/O bus, an PC bus or another suitable transmission interface. The following embodiments are illustrated based the case of a SMBUS, but the disclosure is not limited thereto.

The platform controller hub 21 includes a first temperature sensor 211. The first temperature sensor 211 senses the first operational temperature of the platform controller hub 21. The operational member 27 includes a second temperature sensor 271. The second temperature sensor 271 senses the second operational temperature of the operational member 27. The complex programmable logic device 23 includes a built-in memory 231. The complex programmable logic device 23 reads the first operational temperature sensed by the first temperature sensor 211, reads the second operational temperature sensed by the second temperature sensor 271, and then stores them in the built-in memory 231.

The complex programmable logic device 23 searches for a first offset value related to the platform controller hub 21 and a second offset value related to the operational member 27 in a temperature lookup table. Then, the complex programmable logic device 23 uses the found first offset value to correct the first operational temperature, and uses the found second offset value to correct the second operational temperature. In an embodiment, the complex programmable logic device 23 compares the corrected first operational temperature with the corrected second operational temperature, sets either the corrected first operational temperature or the corrected second offset value to be a device temperature, and stores this device temperature in the built-in memory 231. In practice, the complex programmable logic device 23 selects the larger one of the corrected first and second operational temperatures to be the device temperature.

The hardware monitor 25 reads the device temperature stored in the built-in memory 231, and according to the device temperature, controls the enablement, disablement, rotating speed or other operations of the cooling component 29. The cooling component 29 is, for example, a fan or another suitable component.

In the case of using a SMBUS as the transmission interface used by the platform controller hub 21 to electrically connect to the complex programmable logic device 23, the hardware monitor 25 and the operational member 27, when the complex programmable logic device 23 tries to read the first operational temperature of the platform controller hub 21 and the second operational temperature of the operational member 27, the complex programmable logic device 23 is a master on the SMBUS, and the platform controller hub 21 and the operational member 27 are slaves on the SMBUS, so the complex programmable logic device 23 can read a temperature from the built-in memory 231 through the SMBUS. When the hardware monitor 25 tries to read a device temperature from the built-in memory 231, the hardware monitor 25 will switch to a master on the SMBUS, and the complex programmable logic device 23 will switch to a slave to provide the hardware monitor 25 with the device temperature after reading it from the built-in memory 231 through the SMBUS.

Particularly, the first offset value is defined by the difference between the actual temperature of the platform controller hub 21 and the temperature sensed by the first temperature sensor 211; and the second offset value is defined by the difference between the actual temperature of the operational member 27 and the temperature sensed by the second temperature sensor 271. For example, the actual temperature of the platform controller hub 21 is up to 60° C., but the first operational temperature sensed by the first temperature sensor 211 is only 54° C.; and if the hardware monitor 25 still, in response to the operational temperature of 54° C., controls the cooling component 29 to operate under an insufficient rotating speed or still stay disabled, the platform controller hub 21 may be insufficiently cooled down and thus, be put at the risk of over-temperature. Therefore, the first offset value is able to be used to correct the difference between the related actual temperature and the operational temperature sensed by the first temperature sensor 211; and the second offset value is able to be used to correct the difference between the related actual temperature and the operational temperature sensed by the second temperature sensor 271.

On the other hand, the first offset value and the second offset value are related to the thermal tolerance of the platform controller hub 21 and the thermal tolerance of the operational member 27, respectively. For example, the actual temperature of the platform controller hub 21 is up to 60° C., but the first operational temperature sensed by the first temperature sensor 211 is 54° C.; and if the fan has not been enabled, the platform controller hub 21 will have a great chance to be damaged. For example, the actual temperature of the operational member 27 is up to 60° C., but the second operational temperature sensed by the second temperature sensor 271 is 56° C.; and since the operational member 27 has a higher thermal tolerance than the platform controller hub 21, the operational member 27 may have a lower chance to be damaged than the platform controller hub 21 when the fan has not been started. Therefore, respectively using the first offset value and the second offset value to correct the first operational temperature and the second operational temperature may avoid the difference between the actual temperature and the temperature sensed by the temperature sensor, and may prevent all those, which have a relatively low thermal tolerance, from being damaged.

In another embodiment, the complex programmable logic device 23 compares the first operational temperature with the second operational temperature, uses an offset value to correct either the first operational temperature or the second operational temperature, and then sets the corrected first operational temperature or the corrected second operational temperature to be a device temperature. Specifically, the complex programmable logic device 23 selects and sets the higher one of the first and second operational temperatures to be a device temperature after correcting it with an offset value.

In an embodiment, the operational member 27 is, for example, a baseboard management controller (BMC), a central processing unit (CPU), a dual in-line memory module (DIMM) or another suitable component, and the disclosure is not limited thereto. Also, the disclosure is not limited to the amount of the cooling component 29 that the hardware monitor 25 can handle.

In practice, the hardware monitor 15 is further electrically connected to a CPU through a platform environmental control interface (PECI), so the hardware monitor 15 can acquire the temperature of the CPU via the PECI and then controls the enablement, disablement, rotating speed or other operations of one or more cooling components according to the temperature of the CPU and the temperature of the platform controller hub 11.

To sum up, the disclosure provides an electronic device having a temperature management function, and the electronic device employs a complex programmable logic device to read the operational temperature of a platform controller hub and store it in a built-in memory in the complex programmable logic device, and employs a hardware monitor to read the operational temperature of the platform controller hub from the built-in memory. Therefore, the disclosure may resolve the problem that a hardware monitor cannot read the temperature of a platform controller hub in an existing server motherboard.

What is claimed is:

1. A motherboard of a server having a temperature management function, comprising:
    a platform controller hub comprising a first temperature sensor for sensing a first operational temperature of the platform controller hub;
    a complex programmable logic device comprising a built-in memory and coupled to the platform controller hub, the complex programmable logic device configured to read the first operational temperature obtained by the first temperature sensor, store the first operational temperature in the built-in memory, search for at least one offset value in the built-in memory, and generate a motherboard temperature according to at least the offset value and the first operational temperature; and
    a hardware monitor coupled to the complex programmable logic device and configured to read the motherboard temperature; and
    an operational member coupled to the complex programmable logic device and comprising a second temperature sensor for sensing a second operational temperature of the operational member,
    wherein the complex programmable logic device reads the second operational temperature obtained by the second temperature sensor, stores the second operational temperature in the built-in memory, searches for the offset value related to the platform controller hub in a temperature lookup table, searches for the offset value related to the operational member in the temperature lookup table, the complex programmable logic device corrects the first operational temperature according to the offset value related to the platform controller hub, corrects the second operational temperature according to the offset value related to the operational member, compares the corrected first operational temperature with the corrected second operational temperature to set a larger one of the corrected first and second operational temperatures as the motherboard temperature.

2. The motherboard according to claim 1, wherein the complex programmable logic device searches for the offset value related to the platform controller hub in a temperature lookup table stored in the built-in memory, corrects the first operational temperature with the offset value, and sets the corrected first operational temperature as the motherboard temperature.

3. The motherboard according to claim 1, wherein the complex programmable logic device compares the first operational temperature with the second operational temperature to correct either the first operational temperature or the second operational temperature according to the offset value, and sets corrected one of the first and second operational temperatures as the motherboard temperature.

4. The motherboard according to claim 1, wherein each of the platform controller hub and the operational member is coupled to the complex programmable logic device through an inter-integrated circuit (I2C) bus.

5. The motherboard according to claim 1, wherein the hardware monitor further controls at least one cooling component according to the motherboard temperature.

6. The motherboard according to claim 5, wherein the cooling component comprises a fan.

7. The motherboard according to claim 1, wherein the platform controller hub is coupled to the hardware monitor through a general purpose input/output bus, an inter-integrated circuit bus or a system management bus.

* * * * *